July 2, 1968   F. A. SUMMERLIN   3,390,601

BLIND FASTENING DEVICES

Filed Aug. 4, 1966

Inventor
Frederick A. Summerlin
By Kemon Palmer
Stewart & Estabrook
Attorneys

:::info
3,390,601
Patented July 2, 1968
:::

3,390,601
BLIND FASTENING DEVICES
Frederick A. Summerlin, Harpenden, England, assignor to Avdel Limited, Welwyn Garden City, Hertfordshire, England, a British company
Filed Aug. 4, 1966, Ser. No. 570,356
Claims priority, application Great Britain, Aug. 12, 1965, 34,497/65
2 Claims. (Cl. 85—78)

ABSTRACT OF THE DISCLOSURE

A blind fastener device in the form of a hollow rivet is disclosed in which the breakway mandrel which is used to set and plug the rivet has an annular sleeve surrounding that end of the mandrel nearest the tail of the rivet. The sleeve includes an inwardly tapered portion facing the head of the rivet and the mandrel includes a mating tapered portion so that as the mandrel and the sleeve are drawn into the rivet, the sleeve is sheared and the sheared portion is carried into that portion of the rivet which lies between the work pieces being secured until it abuts an inwardly extending shoulder formed on the inner surface of the rivet to limit the travel of the mandrel into the rivet.

---

Figures 1, 2, 3:
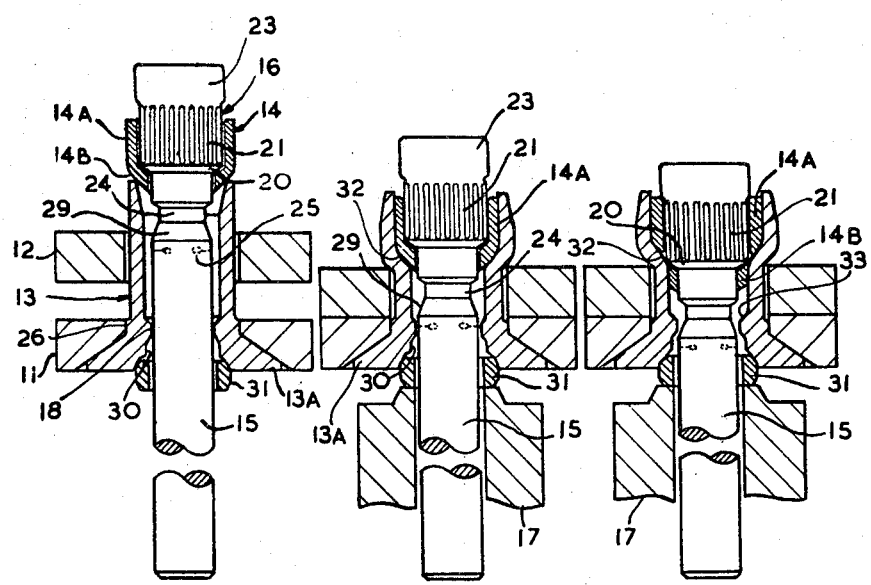

The invention relates to self-plugging blind rivet type fastening devices of the kind comprising a tubular rivet with a head at one end, and a mandrel having a head which is drawn into the tail end of the rivet to expand the latter thereby to clench together workpieces to be riveted together and effect placing of the device, part of the mandrel comprising at least the mandrel head being retained in the rivet to plug or close it.

Such a fastening device is hereafter referred to as "a fastening device of the kind specified."

The invention provides a fastening device of the kind specified, which includes a shearable member carried on or by the retained part of the mandrel, which shearable member is operative in causing expansion of the rivet tail end when the mandrel head is initally drawn into the rivet, the arrangement being such that the shearable member shears at a predetermined value of mandrel tension thereby to end the initial expansion of the rivet tail end and to limt the clench or clamping tension on the workpieces to a predetermined value.

Preferably the shearable member comprises an annular member around the retained part of the mandrel. In a preferred embodiment of the invention, the annular member comprises a sleeve which is sheared circumferentially between the mandrel head and the rivet so that it is divided into two separate portions.

The invention also provides a fastening device of the kind specified, which includes a sleeve on the retained part of the mandrel which sleeve, when the mandrel head is drawn into the tail end of the rivet as aforesaid, is sheared circumferentially between the mandrel head and the rivet so that it is divided into two separate portions.

In a preferred embodiment of the invention, the sleeve is sheared between the tailward end of the mandrel head and the junction between the at least partially expanded tail end part of the rivet and the adjacent part of the rivet.

It is preferred that the rivet includes an internal shoulder near its head end so that the maximum extent of entry of the mandrel head into the rivet is determined by that sheared-off portion of the sleeve which is nearer the head end of the rivet abutting against both the tailward end of the mandrel head and the internal shoulder. Preferably the arrangement is such that the said shearedoff portion of the sleeve is of predetermined dimensions, thereby to predetermine the maximum extent of entry of the mandrel head into the rivet.

In a preferred embodiment of the invention, the end of the sleeve which is nearer the head of the rivet converges, over the tailward end of the mandrel head, towards the mandrel stem. Preferably the tailward end of the mandrel head tapers towards the mandrel stem. Preferably the internal shoulder on the rivet has a taper substantially parallel to that on the tailward face of the mandrel head.

It may be that the arrangement is such that, at least when the workpieces are of sufficient thickness, the shearable member is initially carried on or by that portion of the retained part of the mandrel which eventually lies within the thickness of the workpieces.

A specific embodiment of the invention will now be described by way of example and with reference to the accompanying drawings in which:

FIG. 1 is a side elevation partially in section showing the initial arrangement of the fastening devices, workpieces and mandrel prior to setting the fastening devices; and FIGS. 2 to 5, inclusive, are views similar to FIG. 1 showing in sequence the steps in setting the fastening devices in accordance with the invention.

In this example, the fastening device is used to rivet together two workpieces which are indicated at 11 and 12. The device comprises a tubular rivet 13, a sleeve 14, a mandrel stem 15, and a mandrel head indicated generally at 16.

Figures 4, 5:
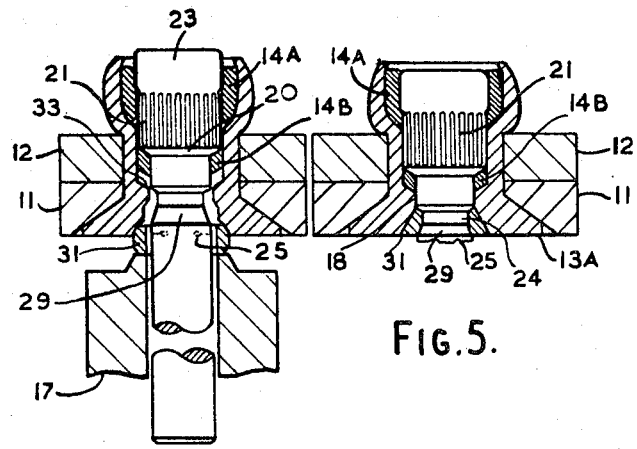

In FIGURES 2, 3 and 4, the anvil of the usual placing tool or gun (not shown) is indicated at 17.

In this example, the tubular rivet 13 has a countersunk head 13a and an external local enlargement 26 closely fitting the opening in the workpiece 11 beyond which it is an easy clearance fit in the opening in the workpiece 12. Near its head, the rivet is formed with an internal shoulder 18 beyond which its internal diameter is substantially greater than the diameter of the mandrel stem 15. The central portion of the rivet head 13a is internally flared and formed with an internal step 30. The anvil 17 of the placing tool bears upon the outer end of a locking collar 31 which is threaded over the mandrel stem 15 and the collar 31 in turn bears against the step 30 in the rivet head 13a.

The tailward end of the mandrel head 16 is in the form of a taper surface 20, which extends from the mandrel stem 15 to a knurled or grooved cylindrical portion 21, which in turn extends to a plain cylindrical portion 23 of larger diameter than the knurled portion 21.

The sleeve 14, which is short relative to the rivet 13, comprises a main portion 14a which is an easy clearance fit over the knurled portion 21 of the mandrel stem 15 and a tapered portion 14b which converges over, and is a close fit around, the taper surface 20. The internal end diameter of the portion 14b is of approximately the same diameter as the mandrel stem 15. The tapered portion 14b of the sleeve facilitates its entry into the rivet 13, which latter is chamfered at its tail end as shown for the same purpose.

It will be seen that the face 33 of the internal shoulder 18 on the rivet which is towards the tail of the rivet is tapered so that it is parallel to the tapered end face 20 of the mandrel head and to the face of the tapered portion 14b of the sleeve.

Close to the first taper surface 20, the mandrel stem 15 is formed with a groove 24 having a face 29, remote from the mandrel head, which is of gradually tapering formation. At that side of the stem 15 remote from the face 29 the stem has a deeper breaker groove 25, which is closed upon itself, for example by thread-rolling, as clearly shown in FIGURE 1.

During placement, the head 17 of the tool employed bears against the outer end of the collar 31, which in turn bears against the step 30 in the rivet head. The stem 15 of the mandrel is pulled in the usual manner to draw the mandrel head 16 into the rivet 13 and break off the stem 15 at the groove 25.

The operation is as follows:

First the sleeve 14 is brought to bear upon the tail end of the rivet 13 (see FIGURE 1), and is then forced into the rivet, expanding the projecting tail of the latter against the rear workpiece 12 and so clenching the two workpieces 11 and 12 firmly together between the rivet head and the expanded part of the tail (see FIGURE 2). The extent to which the sleeve 14 thus enters the rivet 13 is dependent upon the combined thickness of the workpieces, which may vary within wide limits for any one "size" of fastening device.

Second, the taper surface 20, and the junction 32 between the expanded tail end part of the rivet and the adjacent part of the rivet, shear the tapered portion 14b of the sleeve 14 away from the main portion 14a (see FIGURE 3). The face 20 carries the tapered portion 14b down into the shell of the rivet as this is expanded by the knurled portion 21 of the mandrel head (see FIGURE 4).

Finally, the sheared-off tapered portion 14b of the sleeve contacts the internal shoulder 18 which acts as a stop, thus determining the maximum extent of entry of the mandrel head into the rivet. The consequent further increase in the load between the mandrel stem and the gun anvil forces the collar 31 into the flare in the rivet head, removing the step 30, and breaks the stem at the breaker groove 25 which is by then more or less flush with the rivet head. Thus in this example the retained part of the mandrel comprises the mandrel head 16 together with a portion of the mandrel stem (in other words, the part of the mandrel on the side of the breaker groove 25 towards the mandrel head).

It will be seen from a comparison of FIGURES 1 and 5 that, in this example, the sleeve 14 is initially carried (see FIGURE 1) on that portion of the retained part of the mandrel stem which eventually lies within the thickness of the workpieces (see FIGURE 5). This may not necessarily occur if the thickness of the workpieces is very small.

The fastening device of the foregoing example is advantageous in a number of ways.

The force with which the workpieces are clenched together is limited by the force required to shear the sleeve between the faces 20 and 32. Since the parts of device can be manufactured to a known specification of dimensions and material strength, this shear force, and consequently the clenching force on the workpieces, can be predetermined to a given value for workpieces over a range of grip lengths (i.e. total thicknesses). This is a practical advantage. The slight further expansion of the rivet tail by the part 23 of the mandrel head (see FIGURE 5) does not appreciably increase the clench since the apertures are by then filled with metal.

As previously explained, the maximum extent by which the mandrel head enters the rivet is determined by the sheared-off portion 14b abutting between the faces 20 and 33. Since the device can be manufactured so that the final dimensions of the sheared-off portion 14b are predetermined (even if it is squashed between the faces 20 and 33, its volume determines the final spacing between the faces 20 and 33), the extent to which the mandrel head enters the rivet can be held to a predetermined value for a range of grip lengths, so as to position the breaker groove 25 level with (or just above) the rivet head thereby to give a "flush break" (or one which requires little machining of the mandrel stub). This also is a practical advantage.

At no stage in the placement is the sleeve 14 expanded by the knurled portion of the mandrel head, and the plain portion at the extreme end of the mandrel does not expand the sleeve to any great extent, so that there is no tendency for the sleeve to be split or damaged. Furthermore, there is no tendency for the sleeve to be extruded into the rivet between the mandrel stem and the internal wall of the rivet, as occurs with similar devices in which the sleeve is not sheared.

The invention is not restricted to the details of the foregoing example. For instance, the step 30 in the rivet head flare may be omitted, if a more complicated placing gun is used in which a separate anvil ring is used to swage the locking collar into the flare when the mandrel head has been fully pulled into the rivet but before the mandrel is broken.

The shearable member might also be provided in some other form. For instance, instead of the sleeve being sheared, the bottom end of the sleeve can stop short of at the tailward end of the mandrel head, and a separate ring provided, projecting radially from the mandrel head at the top of the sleeve. The ring is formed integrally with, or secured to, the mandrel head, and is sheared off by the top of the sleeve. However such a construction does not provide all the advantages of the preferred embodiment described with reference to the accompanying drawings.

I claim:
1. A blind fastening device comprising:
   a tubular rivet adapted to be inserted through aligned openings in a plurality of workpieces, said rivet having a tail end and an enlarged head portion at the other end thereof, the bore of the rivet having a radially inwardly extending shoulder adjacent said enlarged head portion;
   a mandrel extending through said rivet and projecting beyond each end thereof, said mandrel having a stem and a head at one end thereof adjacent the tail end of the rivet, said mandrel head including a substantially cylindrical portion of greater diameter than said stem and a tapered portion joining said cylindrical portion to said stem;
   said device further including a shearable member in the form of a sleeve mounted on the cylindrical portion of the mandrel head with both the internal and external surfaces of the end of said sleeve closer to the tail end of the rivet converging along the tapered portion of the mandrel head to the stem, the angle at which the sleeve converges substantially corresponding to that of said tapered portion, the diameter of the cylindrical portion of the mandrel head being greater than that of the rivet bore, said shearable member and said mandrel head cooperating to flare the tail end of the rivet when the mandrel is drawn into the rivet, said sleeve adapted to be sheared into two portions between the juncture of the cylindrical and tapered portions of the mandrel head and the juncture of the flared tail end of the rivet and the adjacent part of the rivet, whereby the sheared-off portion of the sleeve nearer the mandrel stem is adapted to abut the internal shoulder of the rivet to determine the maximum extent of entry of the mandrel head into the rivet.

2. A blind faastener device as defined by claim 1 in which said mandrel includes a breakaway portion which separates only after said sleeve is sheared and abutted on said internal shoulder of the rivet.

References Cited

UNITED STATES PATENTS

| 2,536,353 | 1/1951 | Cooper | 85—77 |
| 3,292,482 | 12/1966 | Fry et al. | 85—78 |
| 3,302,510 | 2/1967 | Gapp | 85—77 |

FOREIGN PATENTS

| 472,329 | 9/1937 | Great Britain. |

CARL W. TOMLIN, *Primary Examiner.*

R. S. BRITTS, *Assistant Examiner.*